United States Patent [19]
Feild et al.

[11] 3,856,043
[45] Dec. 24, 1974

[54] PRESSURE RESPONSIVE FLUID VALVE ASSEMBLY

[75] Inventors: Eugene P. Feild, Santa Rosa; Donald C. Bergstedt, Petaluma, both of Calif.

[73] Assignee: FNB Products, Inc., Santa Rosa, Calif.

[22] Filed: Oct. 30, 1972

[21] Appl. No.: 302,382

[52] U.S. Cl. ................. 137/508, 137/540, 251/333
[51] Int. Cl. ......................................... F16k 31/363
[58] Field of Search ...... 137/494, 508, 540, 505.42; 251/333

[56] References Cited
UNITED STATES PATENTS

| | | | |
|---|---|---|---|
| 1,196,142 | 8/1916 | Schroeder | 137/508 X |
| 1,603,514 | 10/1926 | Carter | 137/494 |
| 1,972,748 | 9/1934 | Smith | 251/333 |
| 2,372,631 | 3/1945 | Stevenson | 137/494 |
| 2,932,316 | 4/1960 | Stanton | 137/508 |
| 2,938,540 | 5/1960 | Schatzman | 137/508 |
| 2,963,040 | 12/1960 | Zimmer | 137/505.42 X |
| 3,317,252 | 5/1967 | Gassman | 137/540 X |
| 3,545,485 | 12/1970 | Clark | 137/508 |

*Primary Examiner*—Harold W. Weakley

[57] ABSTRACT

A fluid valve assembly suitable for a number of different uses, including use as a fluid pressure regulator for a pump whose output pressure is to be kept uniform for changing load conditions. The assembly includes a housing, a pair of relatively shiftable valve members in the housing, and means biasing the valve members together. Each valve member has a face which is contiguous to the corresponding face of the other members. One of the valve members has a central orifice therethrough and its face surrounds the orifice to present a land having a length from the orifice to the outer periphery of its corresponding face greater than the diameter of the orifice. The face of a first of the valve members is preferably tapered to present a transversely wedge-shaped space between said faces to facilitate separation of the valve member to open the valve formed thereby. The housing has a fluid inlet in communication with the region surrounding the valve members and a fluid outlet communicating with said orifice.

15 Claims, 13 Drawing Figures

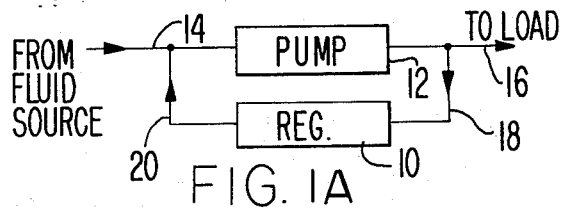
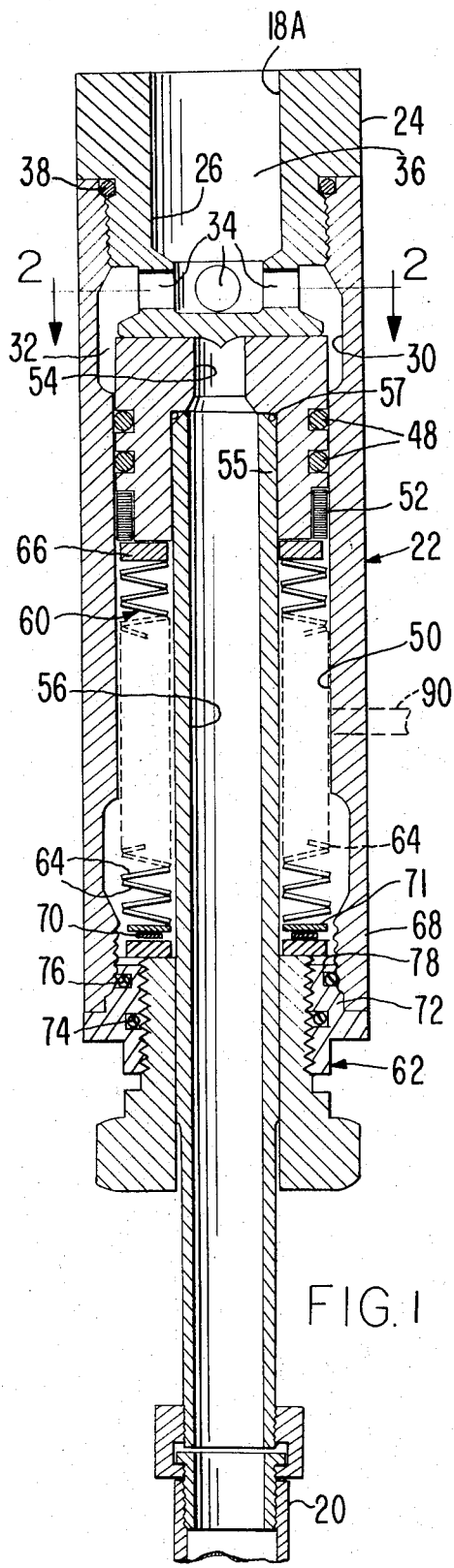
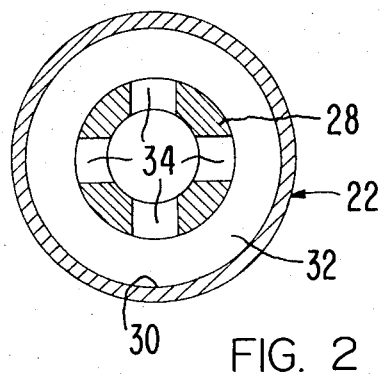
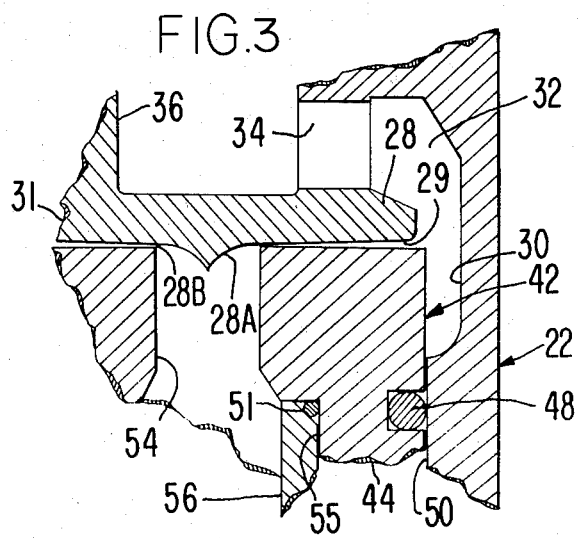
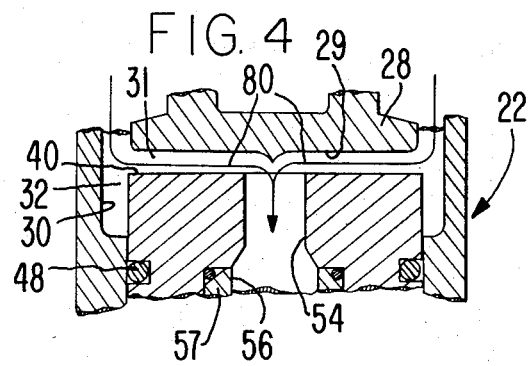

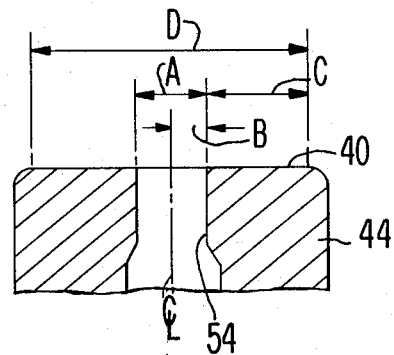
FIG. 4A
FIG. 5
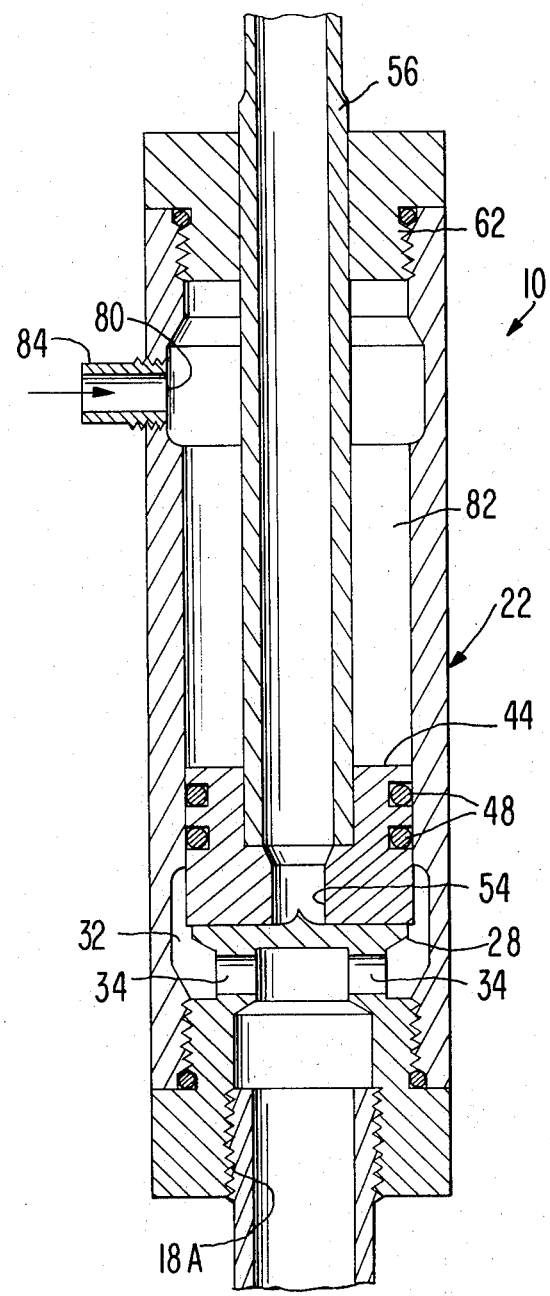
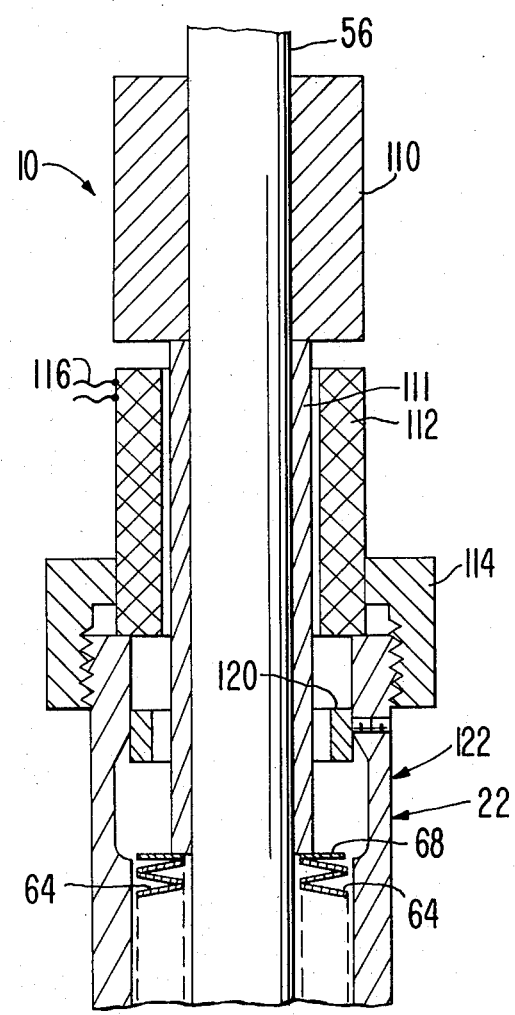
FIG. 7

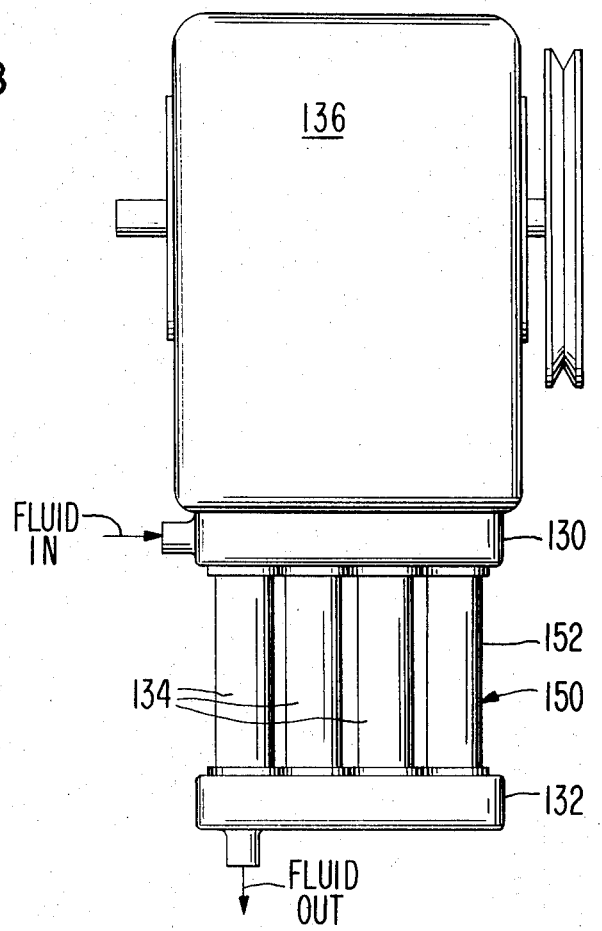
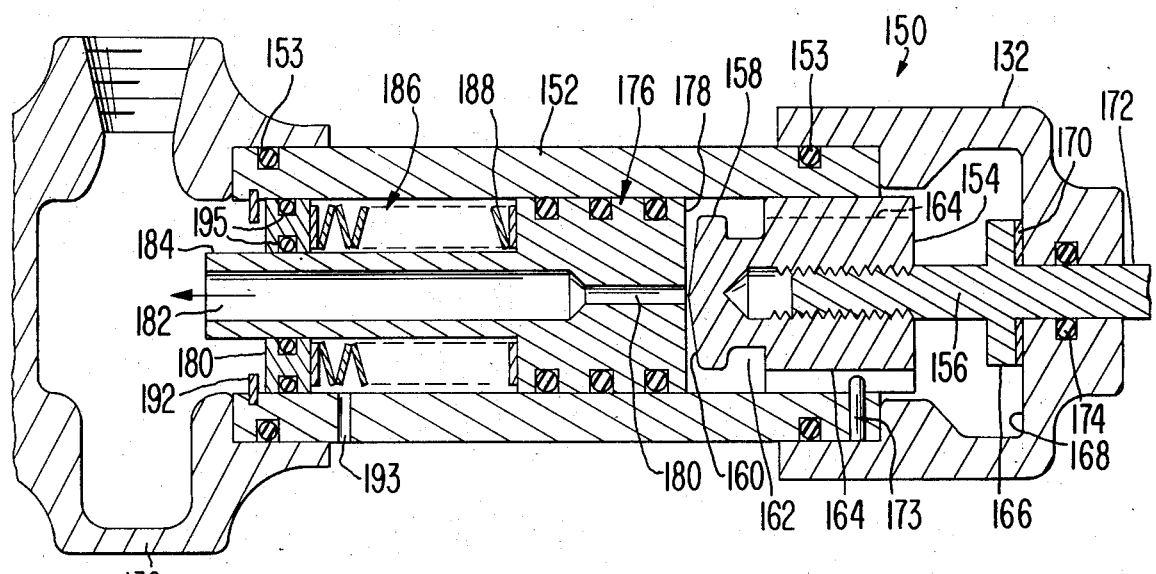

PRESSURE RESPONSIVE FLUID VALVE ASSEMBLY

This invention relates to fluid valves and, more particularly, to a valve assembly especially suitable for use as a pressure regulator for a pump to keep its output pressure substantially uniform over wide variations of discharge volume and fluid temperatures with extreme pressure repeatability.

BACKGROUND OF THE INVENTION

Conventional fluid pressure regulators are generally of the type which utilizes a cone or ball type valve member seating into an orifice with just enough tapered seat width to prevent wear. The shiftable valve member is biased with a coil spring and the pressure seal is usually a formed cup, an O-ring, a diaphragm or bellows.

The construction of the shiftable valve member is such that it tends to bend or drag because of high internal friction and to shift laterally in relation to the seat due to a degenerative turbulence effect, thereby causing improper mating and friction between the valve members. For the above reasons and others to be mentioned later, the outlet pressure of a fluid pump cannot be reliably maintained within a desired range of values for variations in volume rates of fluid flow therethrough. Generally, the best regulation is 10 to 20 percent. This means that the pressure at the outlet of the fluid pump varies by this amount with changes in the output load requirement of the pump.

When conventional regulators under fixed loads and volume rates are cycled on and off, the pressure at the output of the pump will tend to vary at random from 0 to 20 percent from the desired set point. Also, the pressure set point may change hours or days after the pressure has been set.

Moreover, popular seal cup type regulators respond very slowly due to internal friction so that pumps using conventional regulators need air accumulators to reduce high peak pressures in the output flow of the pump. Such accumulators add to the overall cost of the system. Conventional seal cup designs are limited to approximately 160°F. because of the materials and general shape forming the same. Metallic diaphragm seals will stand high temperature, but are not suited for piston pumps at high pressure due to structural fatigue of the diaphragms. Coil springs are subject to breakage and tend to side load the shiftable member causing serious misalignments.

SUMMARY OF THE INVENTION

This invention relates to a fluid valve assembly suitable for a number of different applications but especially suitable for use as a fluid pressure regulator to control the outlet pressure of a fluid pump very accurately, such as to within 1 percent or better, for volume rates of flow which vary over a relatively wide range with pressure repeatability under given load in the order of .01 percent or better, with temperature ratings to 600°F. and a response time up to 9,000 pulses per minute. To this end, the valve assembly of this invention utilizes a valve within a housing with the valve being constructed of two relatively shiftable members, each of the members having a working face with a relatively large surface area and the working faces of the members being contiguous to each other. One of the members has a central orifice therethrough so that fluid flow through the valve, when the latter is open, is from the region near the outer peripheries of the members, through the space between the working faces and into the orifice. The lengths of the working faces relative to the diameter of the orifice and the orientation of the faces relative to the direction of fluid flow through the orifice are such that there is substantially no side loading on the shiftable members. Thus, it is kept centered at all times.

Preferably, the working faces of the members are flat and circular with the face of one of the members being slightly tapered. The two working faces then form an annular, transversely, wedge-shaped space when the valve is closed which permits fluid to enter between the working faces and readily unseat the shiftable member.

The working face design of the present invention permits the use of low friction seals in any size unit between the shiftable member and the housing so as to allow the shiftable valve member to be quickly and easily unseated and to respond to pressure changes up to 9,000 pulses per minute. Thus, if the invention is used as a pressure regulator for a pump, it will respond to each and every stroke of the pump in normal operation, thereby greatly reducing peak pressures that occur with the use of conventional pressure regulators. This, in turn, eliminates the need for accumulators normally used to absorb peak pressures of piston pumps.

The valve members of this invention are biased toward each other by a spring, preferably a spring comprised of a plurality of belleville washers. The bias force of the spring can be fixed or varies to accommodate the regulator for different pump pressures. The belleville washers apply force uniformly so as not to distort the shiftable member.

The land area of the working face of each valve member is relatively large compared with the diameter of the exit orifice. The large land area exposes a varying portion of the shiftable member to the incoming water pressure and has a strong bearing on the turbulence within the seat area between the working faces and, in turn, affects the performance of the assembly when used as a regulator. Some force, not yet defined by consulting hydraulic engineers, effects the shiftable member in such a way as to enhance the overall performance of the regulator. Bernoulli's Law does not fully explain this phenomena. Calculations indicate fluid viscosity has very little effect. The land area is preferably at a 90° angle to the fluid flow through the orifice and allows the fluid, as it passes along the land area to be accelerated without causing lateral forces to be exerted on the shiftable valve member. Thus, this valve member remains centrally located within the housing itself, thereby avoiding the misalignment problems mentioned above with respect to conventional regulators. This, in turn, allows many standard O-ring seals to be used on the shiftable member regardless of its size.

The present invention can be scaled for use as a regulator with a pump of any size and output pressure and can be used with liquids and gases. Also, the present invention can be included as an integral part of the inlet and outlet manifolds of a pump for use as a regulator therefor. The present invention can be constructed as a variable pressure regulator by applying an external force to the shiftable member, such as by a cam or lever.

The primary object of this invention is to provide an improved fluid valve assembly having a pair of relatively shiftable valve members which are constructed to permit the valve formed thereby to be opened and closed in a manner such that there is very little friction between the shiftable valve member and its support so that the valve assembly is especially suitable for use as a fluid pressure regulator for a fluid pump to maintain the output pressure thereof at a set point for variations in the volume rate of fluid flow therethrough.

Another object of this invention is to provide a fluid valve assembly of the type described wherein the assembly, when used as a pressure regulator for a pump, can operate efficiently in high temperature environments and gives extremely good repeatability of pump outlet pressure even though the pump is turned on and off and the volume rate of fluid flow through the pump is varied over a wide range.

Other objects of this invention will become apparent as the following specification progresses, reference being had to the accompanying drawing for an illustration of the invention.

In the drawings:

FIG. 1 is a cross-sectional view of the fluid valve assembly with the valve thereof in a closed, non-operating condition;

FIG. 1A is a schematic view of a system to which the regulator could be coupled;

FIG. 2 is a cross-sectional view of the assembly taken along line 2—2 of FIG. 1;

FIG. 3 is an enlarged, fragmentary view of the valve when the same is open and in an operating condition for low volume flow;

FIG. 4 is a view similar to FIG. 3 but showing the valve open and in an operating condition for high volume flow;

FIG. 4A is a diagrammatic view of one of the valve members showing the various dimensions thereof relative to its land area and to an orifice therethrough;

FIG. 5 is a view similar to FIG. 1 but showing the assembly used as a differential pressure regulator;

FIG. 7 is a view similar to FIGS. 5 and 6 but showing an electromagnetic actuator for opening the valve;

FIG. 8 is a top plan view of a fluid pump utilizing the valve assembly of the present invention as a built-in component;

FIG. 9 is a cross-sectional view of the valve assembly used as a regulator with the pump of FIG. 8.

Figure 6A:
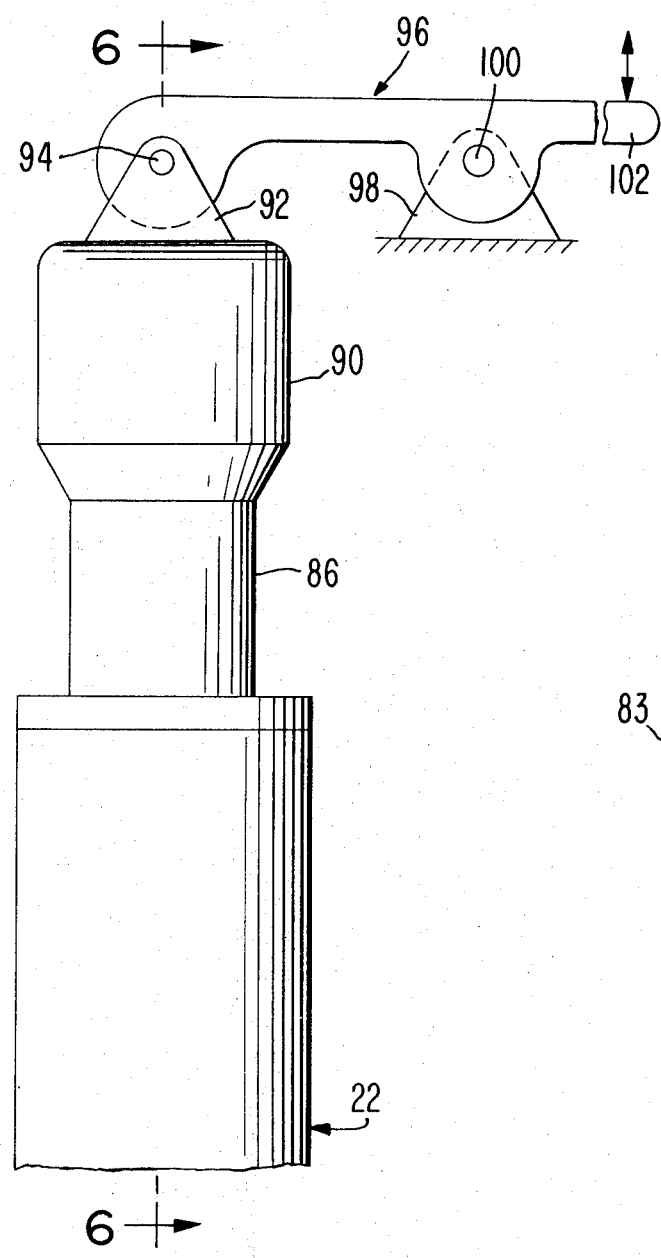
FIG. 6A is a side elevational view of the assembly of FIG. 6, showing the actuator thereof in greater detail.

The fluid valve assembly which is the subject of this invention is broadly denoted by the numeral 10 and, while it is suitable for a number of different uses, it is especially adapted to be used as a fluid pressure regulator in fluid feedback relationship to a fluid pump 12 coupled at its inlet to a source of fluid and at its outlet to a load, such as a hydraulic motor, fluid delivery nozzle or the like. To this end, a fluid, such as water, flows along line 14 to the inlet of pump 12 and exits from the pump outlet and flows through line 16 to the load. A line 18 coupled with line 16 is directed to the inlet of assembly 10, and a line 20 coupled to the outlet of the assembly is connected to line 14. The purpose of the valve assembly as a regulator is to achieve a constant fluid pressure at the outlet of the pump with respect to changes in the volume rate of flow of fluid leaving the pump and flowing to the load.

Assembly 10 includes an outer, tubular housing 22 having a pair of opposed open ends which are internally threaded, as shown in FIG. 1. The housing is symmetrical about its midpoint so that it is reversible in use, i.e., it can be coupled to the other parts of assembly 10 by the arrangement of the parts on either side of the midpoint of the housing.

Assembly 10 further includes a threaded, tubular cap 24 having an externally threaded projection 26 which is threadably connected at one end, namely, the inlet end, of housing 22. Projection 26 extends partially into housing 22 and has a first, fixed valve member 28 at its inner end, the diameter of the inner surface 30 of housing 22 surrounding member 28 being greater than the diameter of member 28 to form an annular space 32 in surrounding relationship thereto. Member 28 also has four or more rightangle fluid ports 34 which are radial to, communicate with, and terminate at the inner end of a central fluid passage 36 having an open end at the outer extremity of cap 24. Cap 24 is threaded at point 18A for connection to pump 12. An O-ring type seal 38 is disposed between the cap and housing 22 to seal the junction therebetween.

The innermost, working face 29 of member 28 has a slight taper thereon as shown in FIG. 3, such taper being omitted from FIGS. 1 and 4 to simplify the drawings thereof. This tapered face cooperates with a flat, working face 40 on a second, shiftable valve member 42 to form an annular, transversely wedge-shaped space 31 communicating with ports 34. The taper is provided to facilitate the opening of the valve formed by valve members 28 and 42.

Valve member 42 comprises a cylindrical piston 44 having a number of O-ring seals 48 for engaging the inner surface 50 of housing 22 to seal the junction therebetween. An annular bearing 52 carried by piston 44 provides a centering device in case of failure of seals 48. A third, notched O-ring could be used in lieu of bearing 52 which would permit some leakage between the piston and the housing and such leakage would exit from the housing to indicate seal failure.

Piston 44 has a central cylindrical orifice 54 therethrough. A tube or tubular shaft 56 is press-fitted in an enlarged portion of a bore 55 communicating with and extending away from orifice 54, an O-ring 57 is provided as a suitable seal between the junction at one end of shaft 56 and piston 44. Thus, shaft 56 moves with the piston relative to member 28.

Spring means 60 between the opposite flat face of piston 44 and an adjustment nut 62 are provided for biasing piston 44 against member 28. Such means comprises a spring formed of a plurality of washer-like springs 64 which are dished and are in face-to-face relationship, as shown in FIG. 1. Such springs are known as stock belleville spring washers of the type shown in Catalog No. B-403 of Associated Spring Corporation, Seaboard Division, P.O. Box 231, Gardena, California 90248. Stacking the washer units 64 in series, as shown in FIG. 1, increases the spring deflection proportional to the number of washers, the load remaining the same as with a single washer. By using a relatively large number of washers, the deflections thereof remain in the linear portions of their characteristic curves. Doubling in parallel of these springs will increase the spring pressure accordingly.

A thrust washer 66 is disposed between spring 60 and piston 44, and a thrust washer 68 is disposed between spring 60 and the inner end flat face of adjustment nut 62. Preferably, a roller bearing 70 is provided between washer 68 and a washer 71 to minimize friction when adjusting the postion of nut 62.

Adjustment nut 62 is threadably carried within an internally threaded bushing 72 which is also threadably coupled to the proximal end of housing 22. The particular way of mounting the adjustment nut 62 is to protect against the removal of piston 44 and spring 60 under pressure in the event that nut 62 is adjusted too far. To this end, bushing 72 has a flat, annular inner face 78 which is in the path of thrust washer 68, should nut 62 become separated from bushing 72. Thus, the bushing will provide a safety feature for assembly 10. Nut 62 can be manipulated manually or by conventional hand tools.

In operation, as a fluid pressure regulator for pump 12, assembly 10 is coupled to the pump as shown in FIG. 1A. Fluid flowing through the pump will pass to the load through line 16. A portion of the fluid will flow into line 18 through assembly 10 and return to line 14 at the inlet of the pump. When fluid enters line 18, it passes into passage 36 and then radially outwardly through ports 34 (FIGS. 1, 2 and 3) into space 32. Because of the taper on the inner end face of member 28, the fluid will enter the transversely wedge-shaped space 31 and will eventually cause piston 44 to move away from member 28 so as to be able to flow into and through orifice 54 of the piston, as indicated by arrows 80 (FIG. 4). The amount of displacement of the piston is a function of the fluid pressure and flow. As piston 44 remains unseated, fluid continues to flow through orifice 54 and out through shaft 56 to line 20 from whence it returns to line 14. As the pressure changes, the displacement of piston 44 changes, thus assuring a constant fluid pressure at the pump outlet. If the pressure increases, piston 44 will tend to move away from member 28; conversely, if the fluid outlet pressure of the pump decreases, the piston will move closer toward member 28. The spring means 60 can be adjusted for increasing or decreasing the bias force on the piston by manipulating nut 62. The inner face of member 28 may have a conical projection 28A (FIG. 3) for minimizing turbulence and wear at the inlet end of orifice 54.

The relationship of the land areas of the working faces relative to the diameter and length of orifice 54 is important to achieve the unexpected results of good pressure regulation and repeatablility of pressure regulation. A number of tests have been conducted on assembly 10 with different land areas and orifice diameters to illustrate this reliance. The results of these tests can bs summarized in Table I with reference to FIG. 4a which is merely schematic and illustrates the specific parameters listed in the table:

| Model | D | A | B | C | C/B | H/A |
|---|---|---|---|---|---|---|
| No. 1 | .750 | .125 | .0625 | .3125 | 5.00 | 2.73 |
| | .750 | .150 | .075 | .300 | 4.00 | 2.27 |
| | .750 | .172 | .0855 | .2895 | 3.386 | 1.98 |
| | .750 | .201 | .1005 | .275 | 2.731 | 1.69 |
| | .750 | .218 | .109 | .266 | 2.440 | 1.56 |

-Continued

| Model | D | A | B | C | C/B | H/A |
|---|---|---|---|---|---|---|
| No. 2 | .937 | .125 | .0625 | .406 | 6.500 | 3.50 |
| | .937 | .150 | .075 | .393 | 5.250 | 1.96 |
| | .937 | .218 | .109 | .359 | 3.300 | 2.00 |
| | .937 | .300 | .150 | .318 | 2.125 | 1.46 |
| No. 3 | 1.312 | .150 | .075 | .581 | 7.746 | 2.92 |
| | 1.312 | .218 | .109 | .547 | 5.018 | 2.00 |
| | 1.312 | .300 | .150 | .506 | 3.373 | 1.46 |
| | 1.312 | .390 | .195 | .461 | 2.364 | 1.12 |

TABLE I

The results of the tests from which the foregoing data were obtained establish that regulation accuracy showed improvement as the ratio of C/B increased. Below a value of 1.5 for this ratio, the accuracy was poor and as the ratio increased above the value of 1.5, the accuracy becomes progressively better. In contrast, conventional regulators insofar as they can be compared with the present invention, have a ratio of land area to orfice size less than 1.

The ratio H/A is important with respect to wear of piston 44. Generally, if this ratio has a value of at least 1, wear is minimized and the wear is further minimized by increasing this value above 1. Also, for two-cycle pumps and pumps whose piston movement is quite slow, the ratio H/A should be at least equal to 1.

The taper on member 28 should be in the range of .0001 inch to .0100 inch for best results in the operation of assembly 10. Taper in this context means the maximum separation of the space between member 28 and piston 44 when the two are in contact with each other at annular edge 28B (FIG. 3). The exact shapes of member 28 and piston 44 are not important so long as the relative taper is maintained and no side thrust is applied to the piston. If the amount of taper is inadequate, the piston oscillates with respect to member 28. If the taper is too large, the accuracy of regulation deteriorates to an unacceptable amount. Although this taper can be formed on either member 28 or piston 44, it is preferred that it be formed on member 28, the fixed part of the valve formed by these two elements.

With the taper being in the foregoing range, regulation of the fluid outlet pressure pump 12 can be achieved within about 1 percent, meaning that the output pressure is kept within 1 percent of the desired output pressure value for large variable volume rate of flow through the pump for all size pumps. This is not possible with conventional regulators of the type using valve seats inasmuch as the lowest regulation achievable with such regulators is about 12 percent, and an average value is about 20 percent for some conventional regulators, such as that of the John Bean division of FMC Corporation, Lansing, Michigan, known as a relief valve assembly and shown in Catalog No. 1260957. In such a type of regulator, the valve seat eventually wears away. Moreover, the valve becomes offset from its seat because of the particular type of construction. The operation of the regulator is very erratic with substantial friction between the moving valve and the adjacent casing. This friction is in the order of 50 percent of the operative pressure in the John Bean type of regulators mentioned above. In the present invention, the friction is approximately 2 percent of operating pressure.

The advantage of the belleville springs is that they do not produce any lateral or tilting component of force on the piston in any degree of compression. A conventional coil spring would produce such a force component and change radically as pressure is applied. Belleville springs are not subject to breakage like a coil spring.

Pressure ranges can be varied by selecting combinations of standard belleville springs. All coil springs must be custom-made. Assembly 10 provides a large ratio of initial compressed length of the spring to the added length compressed due to movement of piston 44. This is equivalent to a relatively small spring constant which allows piston 44 to close at approximately the same pressure all the way down.

The large land area defined by working face 40 of piston 44, in comparison with the diameter of fluid orifice 54 through the piston, causes fluid to accelerate through the land area as it passes from space 32 to the entrance end of orfice 54. Moreover, the pressure distribution in the land area decreases on an exponential basis as orifice 54 is approached. This pressure distribution changes with fluid flow.

The taper between member 28 and piston 44 enhances the velocity increase in the fluid as it flows to the entrance end of orifice 54. Without the taper, this would be equivalent to a very large orifice in relation to the size of assembly 10. As a result, the valve would overcorrect, and piston 44 would pound violently. The taper is provided to allow the use of most of the land area of working face 40 of piston for opening the valve defined by member 28 and piston 44. The very slight taper presents a varying piston area to the input fluid.

The slight oversize of the piston and working face 40, as shown in FIG. 3, and the taper between the face and member 28 allows the inlet pressure of the regulator to work against the relatively large land area of working face 40 even when the valve is closed. This facilitates the initial opening of the valve.

The valve assembly of the present invention, because it permits the fluid to flow radially inwardly through orifice 54, does not impose a lateral force on piston 44 so that the piston is maintained centrally of housing 22 at all times and does not subject it to binding on the inner surface of the housing or valve seat. This allows for the use of O-ring seals in any size which prior art devices could not utilize. Moreover, for very small changes in pressure, only the O-ring flexes instead of significant piston movement to thereby provide almost complete and immediate reaction due to output fluid pressures of pump 12. Furthermore, the response time of assembly 10 is much greater than the reaction time of the pump for changes of output fluid pressures so that, in effect, the operation of the assembly follows the changes in the outlet pressure of the pump on each piston stroke immediately without having to overcome large amounts of friction, as in conventional devices. Also, in conventional devices, changes in peak fluid pressures in the pump output cause fluid hoses and assorted equipment connected to the pump to be subjected to very high shock loads. This is elminated with assembly 10, and also, the noise level of a piston pump drops significantly over that encountered with the use of conventional devices. Therefore, the present invention also eliminates the need for accumulators; it operates to remove stresses from the pump bearings; and operates to remove shock loads from the system due to peak pressure changes directed to the load.

Pressure repeatability with the present invention is extremely good. A pump operating at 750 PSI at a fixed load can be started and stopped or the load turned on and off with pressure repeatability of well under 1 PSI. Conventional regulators will vary at random under the same conditions up to ± 15 percent of the operating pressure.

With the present invention, the regulation of pressure from 0 output to 95 percent of full pump output for any given pump can be maintained at well under 2 percent. To illustrate, a regulator was tested on a 5.5 GPM pump. The pressure was set at 1,000 PSI with no water flowing from the pump. A valve was opened to a 5 GPM orifice. The pressure drop was not readable on the gauge.

With the present invention, a given regulator will operate over extreme ranges of water flow and pressure regulation. To illustrate, a 25 GPM regulator was tested on several pumps, namely, a 1 GPM, 5 GPM, 12 GPM, and 25 GPM pump. Each pump was tested from 50 PSI to 1,000 PSI with excellent performance in all cases. There is no known upper or lower limits. No conventional regulator will operate over such wide ranges.

The present invention can be scaled to the size of a thimble up to any conceivable large size with no basic change in design. No conventional regulator has that capability.

The present invention can be used for very low to very high pressure regulation with no basic change in design. Seat wear will be minimal at very high pressures due to the large seat area. No conventional regulator has this capability.

The present invention can use standard piston seals that will operate from sub-zero conditions to 600°F. Special seals for lower and higher temperatures can be selected for a very wide range of chemicals to be pumped. Conventional regulators use special seal cups or diaphragms. Ths seals are limited to approximately 160°F. and are special for each regulator. The diaphragms are subject to fatigue and cannot be used successfully on high pressure piston pumps.

The present invention will operate with a wide range of fluids within a wide viscosity range. Also, the present invention is adaptable to regulation of gases.

A conventional regulator with a cone or ball-shaped valve seat is unstable in the sense that a slight off-centered shiftable member would tend to go further off center due to asymmetric pressure about the cone. The flat-faced valve seat of the present invention introduces no side forces; thus, it avoids the instability of positioning of the piston. Absence of a side force allows the piston to be provided with very low friction O-ring type seals. Moreover, spring washers 64 do not apply a side load to the piston or distort shaft 56. Thus, this contributes to the capability of assembly 10 to use very close tolerance seats with a large land area.

The very little friction between the piston and housing 22 allows assembly 10 to respond very rapidly to outlet fluid pressure changes of the pump to the point of following each pump piston stroke. This frequency can be as high as 9,000 strokes per minute in the model illustrated. This will vary with regulator configuration. A regulator such as a John Bean type mentioned above responds very slowly. Tests on the John Bean regulator indicated approximately ½ second elapsed time before the regulator responds to a pressure change, thus causing very high peak pressures per piston on a piston pump. The fast response of the present invention provides extremely repetitive pressure under any given condition and greatly reduced the peak pressure buildup per piston stroke caused by slowly responding regulators, such as those having large piston cups. As an illustration, calculations on the John Bean regulator mentioned above indicate approximately 400 PSI seal pressure with operating pressure of 700 PSI against the sidewalls of the regulator. In the present invention, under the same conditions, the pressure against the walls is approximately 15 PSI. Those conventional regulators having diaphragm seals have very low friction but are very complicated and are not suitable for piston pumps due to structural fatigue of the diaphragm itself.

The variables that affect regulator accuracy are as follows:
 a. amount of piston area exposed to input pressure with valve closed versus land area with valve partially or fully open;
 b. land area of piston 44;
 c. taper between member 28 and piston 44;
 d. ratio of orifice 54 diameter to land area of working face 40;
 e. internal frictional forces between piston 44 and the inner surface of housing 22;
 f. sizes of orifice 54;
 g. size of ports 34:
 h. number and size of washers 64.

Bearing 52 provides a centering device for piston 44 if O-rings 48 fail for some reason. The bearing can be cut on one side so it is not a complete loop. Thus, the effective expansion due to heat is only based on the thickness of the bearing and not on its diameter.

For a typical illustrated regulator, parameters for the various parts are as follows:

Housing 22

The housing is formed of seamless, stainless steel tubing having an inside diameter of 1.125 inches and a wall thickness of .25 inch. The diameter of space 32 is approximately 1.28 inches, and the length of housing 22 is aoproximately 4.625 inches.

Cap 24

The cap has an overall length of 1.75 inches. The diameter of member 28 is approximately 1.062 inches, and the diameter of each port 34 is approximately .25 inch. The face of member 28 which is tapered and is first hardened and then ground to form the taper therein. Conically-shaped projection 28A is formed in the face and is optional for high-pressure models. The cap is formed from stainless steel stock having an outer diameter of 1.625 inches. Port 34 must not restrict the input fluid flow.

Piston 44

Piston 44 is formed from stainless steel having an outer diameter of 1.125 inches. Face 40 has a diameter of approximately 1.123 inches. The overall length of the piston is 1.125 inches. The diameter of orifice 54 is approximately in the range between .125 and .390 inch. In a diameter of the enlarged portion of orifice 54A is approximately .555 inch. Face 40 will be ground flat after piston 44 has been hardened.

Shaft 56

This shaft is formed from stainless steel tubing having an outside diameter of about .562 inch and a wall thickness of .095 inch. The overall length is approximately 6.125 inches.

Figure 10:
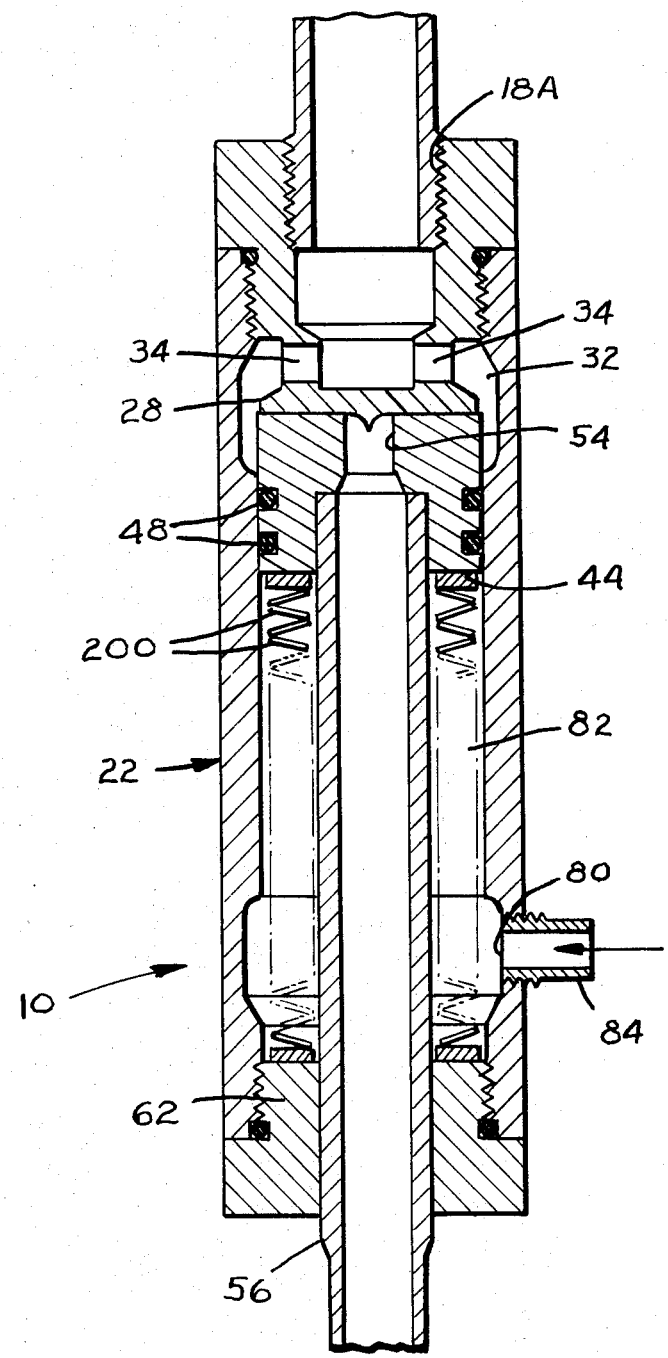
FIG. 10 is a view similar to FIG. 5, but showing the assembly containing a spring.

The teachings of the present invention can be used to form a differential pressure regulator in which two fluid pressures are directed into housing 22 on opposite sides of piston 44. In FIG. 10, fluid enters space 32 on one side of the piston and tube 84 serves as a fluid inlet for the other side of the piston. Tube 84 is coupled to the sidewall of housing 22 for communication with the space between the inner surface of the housing 22 and the outer surface of the shaft 56. The fluid entering space 82 exerts a force against piston 44. With spring means 200, its bias force and the fluid pressure in chamber 82 would be additive to oppose the pressure of the fluid in space 32. The taper, etc. on working face 29 of member 28 would permit the differential pressure regulator to operate in the same highly efficient manner as described above with respect to assembly 10.

The present invention can be built into the output and input pump manifolds of many piston pumps. The base, input and seat areas would be built into the output high pressure manifold. The housing 22 could lay parallel to the cylinders of the pump. The tubular shaft 56 could enter the input manifold with an O-ring type seal. Conventional regulators do not lend themselves to this type of use.

Valve assembly 10 can be modified in the manner shown in FIG. 5 so that it can be controlled remotely, if desired. To this end, assembly 10 (FIG. 5) is essentially the same in construction as shown in FIG. 1 except that the spring means 60 is omitted. Instead of the spring, body 22 has a side port 80 which communicates with space 82 between piston 44 and adjustment nut 62, the latter being simplified only for the purpose of illustration. A tube 84 is coupled in any suitable manner to body 22 in fluid communication with port 80 so that a controlling fluid, such as liquid or air from a fluid source connected to tube 84, can enter space 82 to actuate and serve as "spring" pressure to control the position of piston 44 relative to member 28. Member 28 and piston 44 both have the same working faces as described above with respect to FIGS. 1–4.

In use, the embodiment of FIG. 5 is coupled to a source of fluid (not shown) under pressure by tube 84. The inlet passage 18A is coupled to a pump outlet of the like as described above with respect to FIGS. 1–4 and the outlet of shaft 56 is coupled to the inlet of such pump. Pressure of fluid in space 82 will provide a bias force for piston 44. The assembly is then operated in the same manner as described above relative to FIG. 1 except that the bias force on the piston can be controllably changed by changing the fluid pressure in space 82. This can be done remotely.

If the pressure in space 82 is greater than the pressure of the fluid entering inlet 18a, then piston 44 is moved toward a closed position. If the pressure in space 82 is sufficiently great, the valve formed by member 28 and piston 44 can be effectively closed.

If desired, as depicted in FIG. 10, a spring, such as a plurality of belleville washers, could be used in space 82 for pre-biasing piston 44. The inlet fluid at port 80 would then cooperate with the spring to increase the bias against piston 44 as desired, the fluid at port 80 being controlled remotely.

Figure 6:
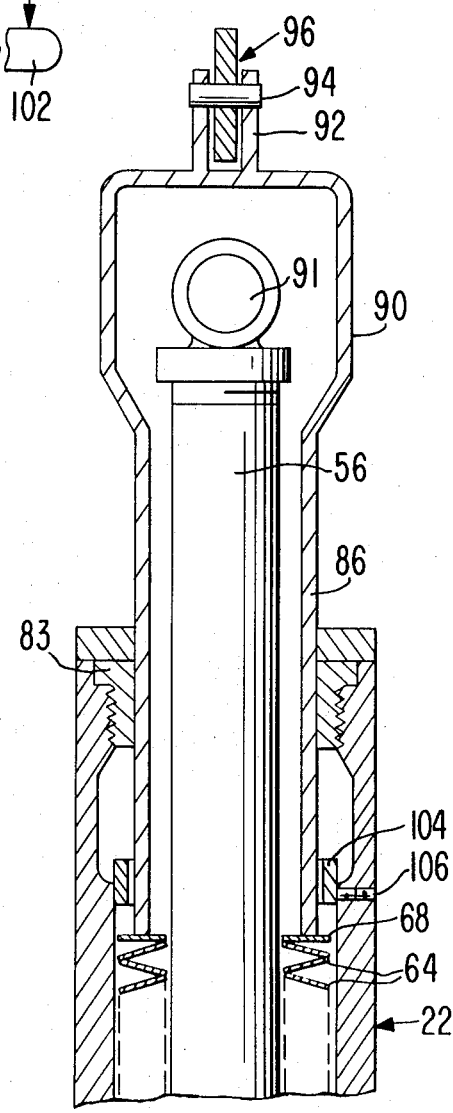
FIG. 6 is a view similar to FIG. 1 but showing a second embodiment of the assembly having a mechanical actuator for opening the valve.

FIGS. 6 and 6A illustrate another way of controlling the position of piston 44 of assembly 10. To this end, a tube 86 surrounds shaft 56 and extends into housing 22 through a threaded guide 83 coupled to the outlet end of the housing. The tube has an outer, U-shaped member 90 secured thereto in any suitable manner and a clevis 92 on the outer end of member 90 is connected by a pin 94 to one end of a lever 96 pivotally connected to a support 98 by a pin 100. Means (not shown) coupled to the opposite end 102 of lever 96 rocks the latter about the axis of pin 100 to thereby shift tube 82 longitudinally of housing 22. An elbow 91 coupled to the outer end of shaft 56 is disposed within member 90.

The inner end of tube 86 bears against the adjacent washer 68. A ring 104 releasably held in housing 22 by a setscrew 106 prevents a blowout of washer 68 and spring washers 64 in the event that tube 86 moves outwardly of ring 104. In lieu of a spring comprised of spring washers 64, a plastic, compressible spring can be used.

Lever 96 can be cam-actuated or manually actuated depending upon the particular use to which assembly 10 is put. The actuation can be periodic or random.

In operation, spring washers 64, normally applying a bias force to the piston, are further expanded by inward movement of tube 86 under the influence of the rocking of lever 96 about pin 100 in a counterclockwise direction when viewing FIG. 6A. This increases the bias force on the piston so as to counter, for instance, a larger inlet fluid pressure in space 32. To decrease the bias force on the piston and thereby reduce the expansion of spring washers 64, a force is applied to end 102 of lever 96 to rock the latter in a clockwise sense when viewing FIG. 6A.

Another actuator for biasing piston 44 relative to member 28 is shown in FIG. 7 wherein a first sleeve 110 of a magnetically permeable material is carried on the outer end of tube 56 and has a second sleeve 111 coupled to one end thereof. Sleeve 111 shiftably extends through the central face of a tubular electromagnet 112 surrounding tube 56 and secured by a connecter member 114 to the outlet end of housing 22. Sleeve 110 is near one end of the electromagnet. Tube 56 is shiftable relative to sleeve 111 and electromagent 112, the latter being coupled by leads 116 to a force of electrical power (not shown).

Sleeve 111 has an inner end face which bears against the adjacent washer 68. A ring 120 within housing 22 is held by a setscrew 122 in the path of washer 68 to prevent excessive movement of the latter outwardly of the housing.

In operation, sleeve 110 is normally spaced from electromagnet 112 and sleeve 111 extending through the electromagnet normally engages washer 68. There will be a certain bias force exerted by spring washers 64 on piston 44 (not shown in FIG. 7). However, to increase the bias on the piston, electromagnet 112 is energized by supplying electrical power thereto, thereby causing sleeve 110 to be attracted to the electromagnet, causing sleeve 111 to move inwardly of housing 22, thereby increasing the bias force on the piston by further expanding spring washers 64. Relaxation of the bias force is achieved by de-energizing the electromagnet.

The use of an actuator as described above to selectively open the valve permits assembly 10 to be used for bypassing purposes, as desired. For instance, it may be necessary to open the valve after a characteristic of the fluid, such as temperature, is sensed, such as in the case when the load is removed from a pump to which the assembly is connected. In this case, the valve could be opened to remove the load due to assembly 10 on the pump to avoid the buildup of temperature of the fluid and thereby the pump as the fluid circulates through assembly 10. This allows the outlet pressure of the pump to drop during idling or standby conditions, thereby avoiding heating of and damage to the pump.

The foregoing actuators can be utilized because of the inherently low internal friction between the piston of assembly 10 and the inner surface of housing 22. This permits the actuator to be applied directly to the piston without the need for amplication of the input power.

Assembly 10 can also be used as a built-in regulator for a fluid pump, such as any of the fluid pumps manufactured and sold by the Cat Pumps Corporation, 1600 65th Avenue N., Minneapolis, Minnesota 55430. A typical pump of this type is shown in FIG. 8 and includes an inlet manifold 130, an outlet manifold 132 and a number of piston and cylinder assemblies 134 between and inter-communicating manifolds 130 and 132. A drive means (not shown) within housing 136 operates to drive the pistons of assemblies 134 in a manner to pump fluid from the inlet manifold 130 to the outlet manifold 132. Ths pistons are generally 120° out of phase with each other. A typical pump of this type operates up to 1,000 psi and up to 25 gallons per minute.

As a built-in part of such a pump, the assembly of this invention, denoted in FIG. 8 by the numeral 150, includes a barrel 152 coupled between inlet manifold 130 and outlet manifold 132. O-ring type seals 153 are used to seal the junctions between the barrel and the manifolds. A cap 154 shiftably carried on a threaded shaft 156 has a valve member 158 provided with a tapered working face 160. Member 158 is spaced inwardly from the inner surface of barrel 152 to present a fluid-receiving, annular chamber 162. A number of grooves 164 in the outer periphery of cap 154 places the interior of outlet manifold 132 in fluid communication with chamber 162.

Shaft 156 extends through and outwardly of manifold 132. A flange 166 on shaft 156 is adjacent to the inner surface 168 of outlet manifold 132 to prevent shaft 156 from being moved out of the manifold. A thrust washer 170 can be used between flange 166 and surface 168. Shaft 156 has an outer end 172 by means of which the shaft can be rotated, thereby moving cap 154 further inwardly of or outwardly of the barrel. A pin 173 through barrel 152 prevents rotation of cap 154 when shaft 156 is rotated relative to outlet manifold 132. An O-ring 174 surrounds shaft 156 and seals the junction between the latter and outlet manifold 132.

A second valve member 176 of the same construction as piston 44 of assembly 10 is disposed within barrel 152 adjacent to member 158. Member 176 has a flat working face 178 adjacent to working face 160 of member 158, the diameter of face 178 being greater than that of face 160. Faces 160 and 178 extend transversely of barrel 152.

An orifice 180 in the center of member 176 is in communication with a central fluid passage 182 in tube 184 connected to member 176. Tube 184 communicates with inlet manifold 130. A spring 186 of belleville washers 188 spans the distance between member 176 and an annular guide 190 is held in place in barrel 152 by a retainer ring 192 in a groove in the barrel. A vent 193 permits air leakage into and out of the barrel. O- ring type sales 195 carried by guide 190 seal the junction between the latter and the barrel.

In operation of the pump, fluid in the outlet manifold 132 flows through grooves 164 into space 162, then into and through the transversely wedge-shaped passage between working faces 160 and 178. The fluid then flows into and through orifice 180, passage 182 and into manifold 130. The operating position of valve member 176 relative to valve member 154 is determined by the fluid pressure in the outlet manifold and thereby the load requirements of the pump.

The values of the land length and diameter of orifice 180 are selected in accordance with the foregoing criteria mentioned above with respect to assembly 10. Thus, regulation of the outlet pressure of the pump is obtained as low as 2 percent or better.

When used with a pump in the manner described above, valve assembly 10 forms a part of a system and, when built into the pump as shown in FIGS. 8 and 9, the assembly provides regulation for the pump in a manner to eliminate the need for an accumulator.

We claim:

1. A fluid valve assembly comprising;
a housing;
means in the housing for defining a valve capable of being opened and closed, said valve having a pair of valve members, one of which is movable, each of the valve members having a working face and the working face of at least of one said valve members has a tapered configuration to define therebetween a transversely wedge-shaped annular space having a maximum separation at the outer periphery in the range of 0.0001 to 0.01 inch, when the valve members are closed;
said housing having inlet means for permitting a flow of fluid thereinto and to a location adjacent to the outer peripheries of the working faces;
one of the valve members having a centrally located orifice extending thereinto from its working face, the working faces being engageable with each other near the orifice to close the valve, the orifice being closed when the valve is closed;
the distance between the orifice and the effective outer periphery of each of the working faces being at least 1.5 times the radius of the orifice;
said housing having a space for receiving a device operable to bias said members toward and into engagement with each other, said wedge-shaped space being in fluid communication with said location so that fluid pressure can cause the valve members to separate from each other when the fluid is at said location to thereby open the valve, whereby the fluid can flow from said location, through said wedge-shaped space past said working faces, and into and through said orifices; and
means coupled with the housing for permitting a flow of fluid out of said orifice.

2. A fluid valve assembly as set forth in claim 1, wherein each valve member is transversely circular, said valve member other than said valve member having a centrally located orifice being fixed relative to the housing.

3. A fluid valve assembly comprising: a housing; means in the housing for defining a valve capable of being opened and closed, said valve having a pair of valve members, one of which is movable, each of the valve members having a working face, and the working face of at least one of said valve members has a tapered configuration to define therebetween a transversely wedge-shaped annular space having a maximum separation at the outer periphery in the range of 0.0001 to 0.01 inch, when the valve members are closed, one of the valve members having a centrally located orifice extending thereinto from its working face, the working faces being engageable with each other near the orifice to close the valve, the orifice being closed when the valve is closed; means in said housing for biasing said working faces toward and into engagement with each other, the distance between the orifice and the effective outer periphery of each of the working faces being at least 1.5 times the radius of the orifice, said housing having inlet means permitting a flow of fluid thereinto and to a location in fluid communication with said space, whereby the fluid can enter said space to separate the valve members and thereby flow into and through said orifice; and outlet means coupled with the housing for permitting a flow of fluid out of said orifice.

4. A fluid valve assembly as set forth in claim 3, wherein is included means coupled with said housing for adjusting the bias force of said bias means.

5. A fluid valve assembly as set forth in claim 4, wherein said bias means includes a plurality of spring washers.

6. A fluid valve assembly as set forth in claim 3, wherein said housing is cylindrical and is substantially symmetrical about its midpoint and said movable valve member is cylindrical.

7. A fluid valve member assembly as set forth in claim 6, wherein the housing has a cylindrical inner wall, the movable valve member being cylindrical and having an annular resilient seal thereon at the outer periphery thereof, said seal slideably engaging said inner wall of the housing.

8. A fluid valve assembly as set forth in claim 6, wherein the housing has a cylindrical inner wall, the shiftable valve member being cylindrical and having a pair of axially spaced annular, resilient seals thereon at the outer periphery thereof, said seal slidably engaging said inner wall of the housing.

9. A fluid valve assembly as set forth in claim 3, wherein said outlet means includes a tubular shaft coupled to and movable with said movable valve member and being in fluid communication with said orifice, said shaft extending through the housing.

10. A fluid valve assembly as set forth in claim 3, wherein said bias means includes a group of spring washers, and including an adjustment nut rotatably mounted on the housing, and a roller bearing between the nut and the proximal washer of said group, said nut being adjustable to vary the bias force of said washers on said working faces, said bearing being operable to reduce the friction between the nut and said proximal washer.

11. A fluid valve assembly as set forth in claim 3, wherein said movable one of said valve members has an end face opposite said working face, said bias means being adjacent to said end face and being operable to apply a bias force uniformly throughout the area of said end face.

12. A fluid valve assembly as set forth in claim 11, said outlet means includes a tubular shaft secured to and extending away from said movable one of said valve members, said end face is annular and surrounds said shaft, said bias means including a plurality of spring washers mounted on said shaft.

13. A fluid valve assembly according to claim 3, wherein said working face of said movable valve member is circular.

14. A valve assembly comprising: a support; a valve coupled with the support and including a pair of valve members, one of which is movable, each of the members having a working face, and the working face of at least one of said valve members has a tapered configuration to define therebetween a transversely wedge-shaped annular space having a maximum separation at the outer periphery in the range of 0.0001 to 0.01 inch, when the valve members are closed, one of the valve members having a centrally located orifice extending therethrough from its working face, the working faces being engageable with each other near said orifice to close the valve; means biasing the valve members toward each other; and means on the support for directing a fluid into a region adjacent to the effective outer peripheries of the working faces, the distance from the effective outer periphery of each working face to said orifice being at least 1.5 times the radius of the orifice.

15. A valve assembly as set forth in claim 14, wherein said valve member other than said valve member having said centrally located orifice, is fixed relative to said support, the working faces of the valve members being transversely circular.

* * * * *